US006171506B1

(12) United States Patent
Allen et al.

(10) Patent No.: US 6,171,506 B1
(45) Date of Patent: Jan. 9, 2001

(54) THICKENING OF AQUEOUS MINERAL SUSPENSIONS

(75) Inventors: Anthony Peter Allen, Shipley; Peter Albert Sedders, Huddersfield, both of (GB)

(73) Assignee: Ciba Specialty Chemicals Water Treatments Limited, Bradford (GB)

( * ) Notice: Under 35 U.S.C. 154(b), the term of this patent shall be extended for 0 days.

(21) Appl. No.: 09/234,252

(22) Filed: Jan. 20, 1999

(30) Foreign Application Priority Data

Jan. 23, 1998 (GB) .................................................. 9801524

(51) Int. Cl.$^7$ ...................................................... C02F 1/56
(52) U.S. Cl. .............................. 210/728; 209/5; 210/734; 210/735; 210/738
(58) Field of Search ................................ 209/5; 210/725, 210/727, 728, 734, 735, 738

(56) References Cited

U.S. PATENT DOCUMENTS

| 4,599,390 | * | 7/1986 | Fan et al ............................... | 526/240 |
| 4,835,206 | * | 5/1989 | Farrar et al. .......................... | 524/457 |
| 5,112,500 | * | 5/1992 | Jones .................................... | 210/728 |
| 5,376,280 | * | 12/1994 | Wilhelm et al. ..................... | 210/741 |
| 5,516,435 | * | 5/1996 | Lewellyn ............................. | 210/728 |

FOREIGN PATENT DOCUMENTS

| 0202780 | 12/1998 | (EP) . |
| 92/00248 | 1/1992 | (WO) . |
| 97/06111 | 2/1997 | (WO) . |

OTHER PUBLICATIONS

Derwent Abstr. 1977:31714.
Derwent Abstr. 91–327004/199145.
Chem. Abstr. 119(22)229747x.

* cited by examiner

*Primary Examiner*—Peter A. Hruskoci
(74) *Attorney, Agent, or Firm*—David R. Crichton

(57) ABSTRACT

A process of thickening an aqueous suspension of mineral solids by sedimentation comprising adding to the suspension water-soluble anionic bridging polymeric flocculant having intrinsic viscosity at least 5 dl/g and water-soluble cationic polymeric flocculant, allowing the solids to settle under gravity so as to form a lower underflow fraction containing a concentration of solids greater than that of the suspension and an upper overflow fraction containing a concentration of solids lower than that of the suspension and removing the underflow fraction, characterised in that the anionic and cationic flocculants are added to the suspension as an aqueous composition formed by blending 1 part by weight of the cationic polymeric flocculant with 2 to 99 parts by weight of the anionic polymeric flocculant and sufficient water to give a total polymer concentration of below 5 wt % and under conditions whereby counter-ionic precipitation can occur and in the aqueous composition substantially all of the anionic polymeric flocculant which is not precipitated by the cationic polymeric flocculant is in solution.

An advantage of the invention is that the flocculants are not restricted by considerations of compatibility and thus it is not necessary (as in much of the prior art) to use, for instance, free-base cationic or free acid anionic flocculants in an attempt at minimising incompatibility, and it is not necessary to add acid, salt or other additives in order to minimise incompatibility.

10 Claims, No Drawings

THICKENING OF AQUEOUS MINERAL SUSPENSIONS

The invention relates to processes for thickening aqueous mineral suspensions by sedimentation using a specified aqueous polymeric composition.

It is often desired to increase the solids content of an aqueous mineral slurry by a thickening operation. In a thickening operation the aqueous slurry of mineral solids is usually placed in a vessel such as a sedimentation tank (or thickener) which controls the movement of the aqueous slurry. The mineral solids settle under gravity and concentrate at the bottom of the tank to form a lower fraction, generally called the underflow solids. The clarified aqueous portion forms an upper supernatant fraction, generally called the overflow.

In thickening operations it is desired to obtain high overflow clarity, ie the content of mineral solids in the upper fraction should be low. This allows recycling of the aqueous fraction if desired. It also ensures minimum loss of solids (in cases where these are of value) and minimum discharge of solids (where these are waste products).

It is also desired to obtain at the same time high underflow solids density, ie the amount of water entrapped in the underflow solids fraction is low. This provides a thickened solids fraction of suitable consistency for further dewatering.

At the same time it is desired to have a high settlement rate, so that clarification and thickening are achieved as rapidly as possible. It is also desirable to obtain reliable and consistent quality of the underflow solids and the overflow.

In order to improve overflow clarity and settlement rate it is known to add polymeric flocculants and/or coagulants to the aqueous suspension in the thickener. In particular high molecular weight anionic polymers, for instance copolymers of acrylamide and sodium acrylate, having very high intrinsic viscosity, for instance 20 dl/g or greater, can be used.

It is also known, in order to increase overflow clarity in cases where the anionic flocculant alone does not give acceptable results, to add low molecular weight cationic coagulant polymers to the aqueous suspension in the thickener. The low molecular weight cationic coagulant, when used, is not added simultaneously with the high molecular weight anionic flocculant, since it is well known that polymers of this type tend to interact physically or chemically with each other, for instance to form a gel or a precipitate. This has hitherto generally been believed to reduce their effectiveness in carrying out their intended purposes of improving overflow clarity. Further, sequential addition is conventionally used because it is believed to provide a desirable floc structure.

In WO92/00248 we describe a process in which suspended solids are separated from an aqueous suspension by a sedimentation process. The invention described in this publication overcomes the well-known problem of co-precipitation of counterionic flocculants, by adding them directly to the suspension, usually as a flowing stream before it reaches the sedimentation tank, in the form of solid polymer. This is said to minimise incompatibility problems.

Other publications also concern sedimentation processes. CA 2,041,627 discloses clarifying slurries and muds by sedimentation with the addition of a high molecular weight polyacrylamide (ie a non-ionic polymer) and a minor amount of a low molecular weight ionic material which can be anionic or cationic. M. Kaiser in Comm. Eur. Communities, [Rep] EUR (1993), EUR 14621, 81 pp discloses studies which test the effect of combined flocculation with anionic and cationic polymers on sedimentation. The anionic and cationic agents are not stated to be added simultaneously and it is assumed that if they are added simultaneously the addition is carried out under conditions such that counterionic precipitation does not occur (as is conventional due to the accepted problems with counterionic precipitation). Alexsandrova et al in Khim. Tverd. Topl. (Moscow) (1976), (3), 57 to 64 disclose comparisons between sedimentation of waste anthracite and waste slurries from coal flotation. The flocculation of the anthracite slurries is tested using cationic flocculant alone or both cationic and anionic flocculants. It appears that when a combination is used an excess of cationic material is included. It is not stated whether the materials are added simultaneously and again it is assumed that if they are added simultaneously it is under conditions in which, as is conventional, counterionic precipitation is not permitted to occur.

Thus none of these disclosures is incompatible with the general belief that conventional blends of quaternary ammonium cationic and sodium anionic high molecular weight polymers should generally be avoided because of precipitation during make-up and dissolution and that thickening of suspensions of mineral solids is best performed using a solution of very high molecular weight water-soluble anionic bridging polymeric flocculant, usually alone but if necessary followed by a solution of low molecular weight water-soluble cationic coagulant to obtain acceptable results.

It would be desirable to be able to improve thickening operations so as to obtain, as well as good overflow clarity and rapid settlement, improved underflow solids density. It is generally found that although the standard application of high molecular weight anionic flocculant improves underflow solids density in comparison with no flocculent treatment, further improvement would be desirable. It is difficult to add polymer directly to the underflow solids in order to attempt to improve underflow solids density.

In the invention we provide a process of thickening an aqueous suspension of mineral solids by sedimentation comprising adding to the suspension water-soluble anionic bridging polymeric flocculant having intrinsic viscosity at least 5 dl/g and water-soluble cationic polymeric flocculant, allowing the solids to settle under gravity so as to form a lower underflow fraction containing a concentration of solids greater than that of the suspension and an upper overflow fraction containing a concentration of solids less than that of the suspension and removing the underflow fraction, characterised in that the anionic and cationic flocculants are added to the suspension as an aqueous composition formed by blending 1 part by weight of the cationic polymeric flocculant with 2 to 99 parts by weight, preferably 2 to 20 parts by weight of the anionic polymeric flocculant and sufficient water to give a total polymer concentration of below 5wt % and under conditions whereby counter-ionic precipitation can occur and in the aqueous composition substantially all of the anionic polymeric flocculant which is not precipitated by the cationic polymeric flocculant is in solution.

Thus the aqueous composition preferably comprises 1 part by weight of the cationic polymeric flocculant with 2 to 20 parts by weight of the anionic polymeric flocculant. More preferably the aqueous composition comprises anionic flocculant to cationic floculant in the range 85:15 to 95:5, preferably around 90:10.

In the invention therefore we deliberately use materials which do undergo counterionic precipitation, we have an excess of the anionic polymer so that a significant amount of anionic polymer can be in solution even in the presence of some counterionic precipitation and we mix the resultant aqueous composition into the aqueous suspension of mineral solids.

We have found that it is unexpectedly possible to obtain improved underflow solids density at the same time as good overflow clarity and settlement rate by a single addition to the aqueous suspension of the defined aqueous polymer composition containing anionic and cationic polymeric flocculent. Addition of a single composition containing anionic and cationic polymer can give better results than has previously been obtainable in conventional art processes using addition of very high molecular weight anionic flocculant. In particular we can improve underflow solids density without the need to attempt to add flocculant or coagulant to the underflow solids.

We find this particularly surprising in view of the disclosures in our international publication WO97/06111. In that publication we describe the application of an aqueous composition of the same general type for pressure dewatering of mineral suspensions having very high solids content (at least 150 g/l). In that publication we disclose our finding that counter-ionic flocculants can be provided in the form of an aqueous composition and give excellent results in pressure dewatering operations despite the fact that precipitated or gelatinous material may appear in the composition.

It is explained in that publication that it is necessary to apply the conventional vigorous mixing which is required for distributing aqueous flocculant into a high solids suspension of the types treated in WO97/06111.

It is particularly surprising that we now find that we can use aqueous compositions of similar type in the very different process of thickening by sedimentation. In the operations described in WO97/06111, vigorous mixing is described as essential, whereas in the present case vigorous mixing is not normally applied in sedimentation thickening operations. Excellent results are nevertheless obtained, which are improved in comparison with those obtained in standard thickening processes.

Further, initial solids content of aqueous suspensions entering thickening operations tend to be much lower than the minimum 150 g/l in WO97/06171 and different flocculation mechanisms occur. In a pressure dewatering system the particles of mineral solids are constrained and the aqueous liquid containing them is free to move. Conversely in a thickening operation the aqueous liquid is constrained and the mineral solid particles are free to move within it. However, we find surprisingly that aqueous compositions of the same type are effective in thickening operations for improving both overflow clarity and underflow solids density whilst maintaining acceptable settlement rate and whilst using only a single dosing point. This is achieved despite the very different conditions of lower shear and lower solids content in a thickening operation in comparison with a pressure dewatering operation.

When activating polymer with water (ie dissolving the polymer) prior to adding it to a suspension, normal practice requires that the activated aqueous composition should be as homogeneous as possible and should contain substantially no visible evidence of precipitated or gelatinous material. In the invention, however, we find that improved performance is obtained even though the aqueous composition, on close examination, may be seen to be less homogeneous, often substantially less homogeneous, than would normally be thought to be desirable.

For provision of the aqueous composition either polymer can be supplied as a preformed solution but generally the polymers are supplied initially as powders or reverse phase emulsions (which may be anhydrous). Accordingly, the aqueous composition is generally formed by mixing into water the polymers in powder form or the polymers in emulsion form. Preferably the aqueous composition is formed by mixing into water the polymers in powder form.

The polymers may be mixed sequentially or simultaneously into the water which is to provide the aqueous composition but generally they are mixed simultaneously. Preferably they are provided as a preformed blend of the polymers, usually in solid form, and this blend is mixed into water. Thus preferably the polymers are supplied as a blend of cationic polymer powder and anionic polymer powder and this blend is mixed with sufficient dilution water to form the aqueous composition having a total polymer content of below 5 wt % in which the anionic polymeric flocculent is dissolved.

The total polymer content (ie anionic plus cationic) is generally from about 0.001 to about 5 wt % polymer solids based on weight of composition, more usually about 0.01 to about 1 wt %, preferably about 0.05 to about 0.5 wt %.

The mixing of the polymers into water to form the aqueous composition may be performed in conventional make-up apparatus. After initial mixing and before addition to the suspension it is generally preferred to allow the dilute aqueous composition to age, optionally with mixing, to allow substantially all of the anionic polymer which is not precipitated by the cationic polymer to go into solution. This may require ageing for instance for at least 10 minutes, and often at least 30 minutes, and frequently at least an hour when either or both polymers are supplied as a powder.

It is not essential that all the polymeric material goes fully into solution in the aqueous composition before addition to the suspension. In particular the cationic polymer may not dissolve fully. It is also not essential that no gelation or precipitation be observed on mixing. In fact, we find that a composition which can be seen to be a non-homogeneous product gives improved results and it is essential in the invention that production of the aqueous composition takes place under conditions in which counterionic precipitation can occur. Suitable mixing times and conditions for any particular combination of polymers can be determined by experimentation.

We believe that the mechanism which takes place on formation of the aqueous composition involves the anionic polymeric flocculant initially going substantially wholly into solution. Some of the anionic polymeric flocculant is then precipitated onto or with the cationic Polymeric flocculant to form a precipitate (which may be colloidal or larger). It appears to be beneficial to add the aqueous composition to the suspension of mineral solids whilst the aqueous composition contains both dissolved anionic polymer and a precipitate containing cationic polymer and some of the anionic polymer.

In the aqueous composition the anionic polymer should be substantially completely dissolved, that is little or none of it should remain in its initial undissolved powder or emulsion form and instead it should substantially all (excluding the proportion which has been incorporated into a counterionic precipitate) have gone into solution. In practice it is generally desirable that at least 50 wt %, and preferably at least 75 wt %, more preferably at least 80 wt %, of the amount of anionic polymer which is introduced into the aqueous composition should be in solution, ie available to initiate clarification as soon as the aqueous composition is added to the suspension of mineral solids.

The cationic polymer is added in a lesser amount than the anionic polymer. The ratio of anionic polymer to cationic polymer is 20:1 to 2:1 by weight, preferably from 15:1 to 2:1, more preferably 12:1 to 4:1, often about 9:1 by weight.

The amount of cationic polymer is always relatively small compared to the amount of anionic polymer, and it is generally preferred that the process is conducted so that the anionic polymer forms a type of coacervate or precipitate around the cationic polymer. Accordingly, it can be seen that only a very small proportion of the anionic polymer will enter into a precipitate and, instead, the majority can be in true solution in the aqueous composition.

The anionic polymeric flocculant is generally a synthetic polymer and in particular is usually a water-soluble polymer of water-soluble ethylenically unsaturated anionic monomer or monomer blend. Generally at least 3 wt %, often at least 5, 10 or 15 wt % but preferably not more than 70 or 80 wt % of the monomers are anionic, with any other monomers being non-ionic.

Preferred anionic monomers are ethylenically unsaturated carboxylic or sulphonic acids, generally as their water-soluble alkali metal (usually sodium) salts. Examples are 2-acrylamido-2-methyl propane sulphonic acid (AMPS, US Trademark), methacrylic acid and acrylic acid (as sodium or other alkali metal salt). Sodium acrylate is preferred.

Suitable water-soluble ethylenically unsaturated non-ionic comonomers include acrylamide and methacrylamide.

Preferred anionic polymers are copolymers of acrylamide and 20 to 60 wt % sodium acrylate. Alternatives include homopolymers of sodium acrylate and copolymers of acrylamide and AMPS, in particular copolymers of AMPS and up to 97 wt %, often up to 95 wt %, (meth) acrylamide. A blend of anionic polymers may be used.

The anionic polymeric material should be water-soluble and should be a high molecular weight bridging flocculent having intrinsic viscosity (IV) of at least about 5, preferably at least about 8, often at least about 10 dl/g IV may be as high as 30 dl/g or greater although it is not usually above 25 or 20 dl/g and is often in the range about 10 to about 17 dl/g.

In this specification intrinsic viscosity is measured by suspended level viscometer in 1N NaCl at 25° C. buffered to pH 7.

We find that good results are obtained with anionic polymers having IV below 20 dl/g, and even below 16 or 15 dl/g. This is surprising in view of the fact that standard anionic polymers for thickening processes tend to have very high IV, for instance above 20 or 22 dl/g.

The cationic polymeric flocculant is preferably a synthetic polymer but can be a naturally occurring cationic polymer or a modified naturally occurring cationic polymer. Preferably it is formed from water-soluble ethylenically unsaturated monomer or monomer blend. The cationic polymer may be a blend of polymers. It is water-soluble.

The polymer may be formed from monomers of which substantially 100% are water-soluble cationic ethylenically unsaturated monomers. Preferably it is formed from a water-soluble blend of cationic and non-ionic ethylenically unsaturated monomers. The preferred amount of cationic monomer is 10 to 80 wt %, more preferably 10 to 60 wt %. The remainder is usually water-soluble ethylenically unsaturated non-ionic monomer.

Suitable cationic monomers include dialkyl amino alkyl (meth) acrylamide and, preferably, -acrylate, as acid addition or, preferably, quaternary ammonium salts, and diallyl dialkyl ammonium halides. Preferred acrylates and methacrylates are di-$C_{1-4}$ alkyl amino ethyl (meth) acrylates and preferred acrylamides and (meth) acrylamides are di-$C_{1-4}$ alkyl amino alkyl (meth) acrylamides, in particular dimethyl amino ethyl (meth) acrylate (DMAE(M)A) and dimethyl amino propyl (meth) acrylamide (DMAP(M)A), with the respective methacrylate and methacrylamide compounds being particularly preferred, as acid addition and, preferably, quaternary ammonium salts. The preferred diallyl dialkyl ammonium halide is diallyl dimethyl ammonium chloride (DADMAC).

Suitable non-ionic monomers include acrylamide and methacrylamide.

The cationic polymer is preferably a high molecular weight bridging flocculant, typically having IV at least 2, preferably at least 4 dl/g, more preferably at least 6 and typically up to 12 or even 17 dl/g or higher.

In this case the preferred polymers are copolymers of dialkyl amino alkyl (meth)-acrylate and -acrylamide monomers with acrylamide or other non-ionic monomer. Mixtures of cationic polymers may be used.

It is particularly surprising that in the invention we use as a preferred cationic polymeric flocculant a high molecular weight material which gives excellent and improved results, in particular in comparison with the standard systems which generally use anionic polymer alone. If a cationic polymer is used it is usually a low molecular weight cationic coagulant type material, thus improved results using high molecular weight cationic polymer are especially surprising.

In some instances satisfactory results are obtained when the ionic content and the molecular weight of the cationic polymer are such that it may be regarded as a coagulant rather than a bridging flocculant. In this case it is preferred for at least 50 wt %, generally at least 80 wt %, of the monomers from which it is formed to be cationic. Polymers in which 100% of the monomers are cationic are then preferred.

In particular polyDADMAC is preferred. Copolymers of DADMAC which contain up to 30 wt % acrylamide are also useful. Other suitable low molecular weight polymers include polyethylene imine and polyamines, such as polyamine epichlorine hydrin reaction products.

The low molecular weight polymers generally have IV below 3, preferably below 2.4 dl/g, but usually above 0.2 or 0.5 dl/g, for instance 0.8 to 1.5 dl/g. Measured by GPC, the molecular weight is usually above 50,000 and often above 100,000 but frequently below 1,000,000 or 3,000,000. Both the anionic and cationic polymeric flocculants are essentially water-soluble, but either polymer may be of the type described in EP-A-202,780 containing a soluble fraction and a particulate insoluble fraction having a particle size below 10 $\mu$m.

An advantage of the invention is that the flocculants are not restricted by considerations of compatibility and thus it is not necessary (as in much of the prior art) to use, for instance, free-base cationic or free acid anionic flocculants in an attempt at minimising incompatibility, and it is not necessary to add acid, salt or other additives in order to minimise incompatibility. Instead, the flocculants can be the conventionally available flocculants mixed under conditions whereby counterionic precipitation can occur. Thus some degree of non-homogeneity will be seen to exist if the defined amounts of the selected flocculants are activated gently, without application of sufficient shear to disperse any counterionic precipitate which is formed.

In practice, the invention is best performed by using an anionic polymeric flocculant in which most or all (eg above 50 wt % and usually above 80 wt %) of the anionic groups are in alkali metal salt form (or other water-soluble salt form) and cationic amino polymeric flocculant wherein most or all (above 50 wt % and usually above 80 wt %) of the amino groups are in the form of quaternary ammonium salt groups, both polymers having IV above 4 or 5 dl/g, so that they are both bridging flocculants.

The preferred process of the invention uses a blend of a bridging copolymer of acrylamide and sodium acrylate with a bridging quaternised copolymer of acrylamide and dialkyl amino ethyl (meth) acrylate.

For the purposes of this invention, it can be assumed that the defined blends of excess of the anionic bridging polymeric flocculant with a minor amount of the cationic polymeric flocculant are blends which will give counterionic precipitation unless compatibilisation compounds are added to minimise this, and in the invention such compounds are unnecessary.

The optimum solution concentrations of the blend can be determined for any particular case by routine experimentation.

The polymers which are used in the invention can be made by conventional techniques. For instance, the powders may be made by bulk gel polymerisation followed by comminution and drying or by reverse phase bead polymerisation followed by drying and optionally comminution.

The thickening process of the invention is carried out in a thickening vessel which holds the suspension as sedimentation takes place. The vessel can be a natural vessel such as a pond but the process is generally carried out in thickening apparatus such as a sedimentation tank, often referred to as a thickener, in which sedimentation takes place.

In the process the aqueous suspension of mineral solids is supplied to the thickener and sedimentation is allowed to take place. During this process the mineral solids settle under gravity to the lower part of the thickener so as to form a lower underflow solids fraction. This is thickened, ie it has a concentration of solids higher than that of the suspension initially supplied to the thickener. At the same time an upper overflow fraction forms which is clarified, ie it has a concentration of solids lower than that of the suspension initially supplied to the thickener.

The underflow solids are removed from the thickener, usually for further dewatering and use or disposal. The clarified overflow is also removed either for use, recycling or disposal.

The process may be carried out as a batch process, but usually it is a continuous process, in which underflow solids and overflow are continuously removed from the thickener as fresh aqueous suspension is continuously added.

Preferably the underflow solids are subjected to low shear by a standard raking mechanism. The rotational speed of the rakes is generally from 0.1 to 1.0 rpm. Thus we achieve good underflow solids densities without subjecting the suspension or the thickened solids to high levels of shear, as in WO97/06111.

Although the aqueous composition can be added to the suspension whilst the suspension is a flowing stream, for instance as it travels towards the thickener, preferably it is added to the suspension whilst the suspension is held within the thickener. Normally the aqueous composition is added in standard manner to the feed launder or feedwell at the inlet to the thickener. The mixing and shearing forces at this point are typically rather low, in particular in comparison with those found in processes for treatment of very high solids mineral suspensions by pressure dewatering (as in WO97/06111) and it is therefore further surprising that the aqueous composition containing co-precipitated anionic and cationic polymer is effective in the present case.

In the invention it is preferred that the aqueous composition is added to the aqueous suspension at a single dosing point. Surprisingly we find that this nevertheless gives benefits in two separate aspects of the process. It gives overflow clarity benefits together with underflow solids density benefits. It is also possible to add the aqueous composition at two or more dosing points. If two or more dosing points are used these are usually the same points in any particular process at which multi-stage dosing of conventional high molecular weight anionic flocculant takes place.

Dosage of total active polymer in batch and continuous processes is normally about 5 to 500 g active polymer/tonne dry solids. In continuous processes the dosage of aqueous composition is normally from about 0.5 to about 5 kg/hour (active polymer).

The aqueous suspension of mineral solids usually has solids content at least 5 g/l. Solids content may be as high as 250 g/l or greater but is usually not more than 200 g/l, preferably not more than 140 or 125 g/l and more preferably not more than 100 g/l. Usually it is at least 10 or 20 g/l.

Suitable suspensions for thickening include coal based slurries such as barrel wash effluents, tailings and screen underflows. Tailings and barrel wash effluents in particular are suitable. Other suitable suspensions include sand effluent, limestone effluent, china clay suspensions, calcium carbonate suspensions and tailings and concentrates from hydrometallurgy operations, for example those based on copper, zinc and alumina.

The invention will now be illustrated by reference to the following examples.

EXAMPLES

Example 1

Sample Preparation
1. The required quantities of solid anionic and cationic polymer were individually weighed out prior to combination in a clean container.
2. Samples were homogenised by manual agitation using a plastic scoop.
3. The required polymer make-up tank (either 1m$^3$ or 5m$^3$ in size fitted with a low shear type impeller mixer set at 200 rpm) was half filled with plant water using a hosepipe and a mixer was started to induce agitation.
4. Once half full, the water line was transferred to an eductor and the pre-weighed blend of anionic/cationic polymer was introduced to the tank slowly with continued agitation.
5. Agitation continued for a further hour prior to the sample being used for subsequent thickener testwork.

The products evaluated were as follows:

Product A: Copolymer of 53 wt % acrylamide/47 wt % sodium acrylate, IV 24.0 dl/g. The polymer for Product A was made up at 0.3 wt % and diluted in line with plant water.

Product B1: Blend of 90 wt % anionic copolymer of 65 wt % acrylamide/35 wt % sodium acrylate, IV 14 dl/g and 10 wt % copolymer of 40 wt % acrylamide/60 wt % OMAEA quaternised with methyl chloride, IV 7 dl/g. Total active polymer concentration was 0.3 wt %.

Product C: Anionic copolymer of 65 wt % acrylamide/35 wt % sodium acrylate, IV 14 dl/g. Total active polymer concentration was 0.1 wt %.

Product B2: As Product B1, except that the active polymer concentration was 0.1%.

All polymers were provided as powders produced by bead polymerisation. All dose levels are kg dry active polymer per The made-up samples were tested in a thickener.

Thickener Operation
1. The transfer pump was a DB7 monopump with a 2" outlet. This was adapted in line to a 1" pipe. The pump was run at a low speed to avoid pressure build-up at the adapter.

2. The 1" pipe was attached to the standard polymer addition point on the launder of the thickener (a standard continuous thickener).

3. Samples of underflow solids were removed every 20 mins from the base of the thickener for density (underflow SG) measurements and either CST (capillary suction time) or turbidity readings were taken. When products were changed approximately 30 minutes were allowed prior to subsequent readings being taken. The retention time in the thickener was estimated to be 15 to 20 minutes.

Trial 1

Product A was supplied to the thickener at a rate of 2.0 kg/hour. Results are shown in Table 1 below.

TABLE 1

| Time/min | Underflow SG | CST/s |
| --- | --- | --- |
| 20 | 1.10 | 37.2 |
| 40 | 1.10 | 29.1 |
| 60 | 1.06 | 15.8 |
| 80 | 1.06 | 48.7 |
| 100 | 1.05 | 36.2 |
| 120 | 1.06 | 38.5 |
| 140 | 1.09 | 31.5 |
| 160 | 1.02 | 26.9 |

These results show significant fluctuation in CST, indicating undesirable variability in flocculant structure.

Product B1 was supplied to the thickener at a rate of 5.3 kg/hour. Results are shown in Table 2 below.

TABLE 2

| Time/min | Underflow SG | CST/s |
| --- | --- | --- |
| 20 | 1.16 | 52.4 |
| 40 | 1.17 | 56.2 |
| 60 | 1.16 | 51.6 |
| 80 | 1.16 | 49.2 |
| 100 | 1.19 | 32.3 |
| 120 | 1.20 | 21.8 |
| 140 | 1.16 | 13.0 |

Further tests were carried out using Product A at 2.0 kg/hour. Results are shown in Table 3 below.

TABLE 3

| Time/min | Underflow SG | CST/s |
| --- | --- | --- |
| 20 | 1.05 | 55.2 |
| 40 | 1.06 | 50.8 |
| 60 | 1.07 | 47.7 |

Product B2 was tested at an addition rate of 1.2 kg/hour. Results are given below in Table 4.

TABLE 4

| Time/min | Underflow SG | CST/s |
| --- | --- | --- |
| 20 | 1.09 | 14.1 |
| 40 | 1.12 | 32.7 |
| 60 | 1.15 | 20.6 |
| 80 | 1.18 | 25.7 |

This table shows that Product B2 can be added at a dose significantly reduced in comparison with that of Product A and at the same time produces improved underflow specific gravity and faster CST results. At the same time it maintains acceptable overflow clarity and solids settlement rate.

Trial 2

Product A was used at various dosage rates as shown. Results are shown in Table 5 below.

TABLE 5

| Dose Rate (kg/hr) | Underflow SG | Turbidity/ NTU |
| --- | --- | --- |
| 2.0 | 1.11 | 250 |
| 1.7 | 1.10 | 760 |
| 1.9 | 1.10 | 327 |
| 1.9 | 1.08 | 812 |
| 1.9 | 1.05 | >1000 |
| 2.3 | 1.06 | >1000 |

The underflow specific gravity results are similar to those in Trial 1 for Product A. The supernatant turbidities show significant fluctuation, which mirrors the results obtained in Trial 1 for CST.

Product C was tested at various dosage rates, as shown. Results are given in Table 6 below.

TABLE 6

| Dose Rate (kg/hr) | Underflow SG | Turbidity/ NTU |
| --- | --- | --- |
| 5.1 | 1.08 | 899 |
| 5.1 | 1.11 | 776 |
| 5.1 | 1.11 | 617 |
| 3.2 | 1.12 | 600 |
| 3.2 | 1.11 | 166 |
| 3.2 | 1.11 | 140 |
| 3.2 | 1.11 | 116 |
| 3.2 | 1.12 | 125 |

It can be seen that underflow specific gravity results for Product C are generally inferior to those for Products B1 and B2.

In particular, the results for Product B2 are obtained at a significantly lower dose.

Further tests were then carried out using Product A at various dosage rates, as shown. Results are given in Table 7 below.

TABLE 7

| Dose Rate (kg/hr) | Underflow SG | Turbidity/ NTU |
| --- | --- | --- |
| 2.3 | 1.12 | 199 |
| 1.9 | 1.13 | 149 |
| 1.7 | 1.13 | 270 |
| 1.9 | 1.12 | 360 |
| 1.9 | 1.13 | 401 |
| 7.9 | 1.11 | 483 |

These results confirm that using Product A can give variable performance.

These results show that the products of the invention B1 and B2 can give excellent underflow structure as demonstrated by specific gravity SG and CST in comparison with the standard product for this application, Product A and the product without the cationic fraction, Product C.

Trial 3

Product A and product B1 were tested at various dose rates, as shown. Results are given in Table 8 below.

It can be seen that Product B1 can be added at a dose significantly reduced in comparison with that of Product A and also produce improved clarity and compaction.

TABLE 8

| Product | Dose Level (Kg/hr) | Settlement Rate (cm/min) | Underflow SG (cm/min) | Turbidity (NTU) | Compaction (cm³) |
|---|---|---|---|---|---|
| A | 7.71 | 87.7 | 1.20 | 136 | 150 |
|  | 5.94 | 80.0 | 1.26 | 74 | 150 |
|  | 4.52 | 87.7 | 1.24 | 199 | 125 |
|  | 4.00 | 87.5 | 1.23 | 34 | 130 |
|  | 3.87 | 37.9 | 1.20 | 34 | 130 |
|  | 4.08 | 22.8 | 1.13 | 41 | 140 |
|  | 4.11 | 21.2 | 1.04 | 45 | 160 |
| B1 | 2.20 | 45.7 | 1.16 | 8 | 80 |
|  | 2.20 | 43.5 | 1.17 | 14 | 75 |
|  | 2.20 | 41.6 | 1.21 | 8 | 80 |
|  | 2.20 | 43.4 | 1.10 | 3 | 90 |
|  | 1.80 | 28.4 | 1.12 | 2 | 90 |
|  | 1.80 | 43.4 | 1.21 | 2 | 60 |
|  | 1.80 | 47.2 | 1.16 | 9 | 80 |

Trial 4

Product A was tested at various dose rates together with an additional constant coagulant dose of 4.8 kg/hour in order to maintain an acceptable clarity. Product B1 was tested at various doses. The results are shown in Table 9 below.

It can be seen that Product B1 produces improved clarity and compaction than Product A, even when Product A is used at a higher dose.

TABLE 9

| Product | Dose Level (Kg/hr) | Settlement Rate (cm/min) | Underflow SG (cm/min) | Turbidity (NTU) | Compaction (cm³) |
|---|---|---|---|---|---|
| A | 4.08 | 100 | 1.08 | 30 | 85 |
|  | 3.88 | 85.0 | 1.08 | 38 | 95 |
|  | 3.00 | 83.6 | 1.11 | 30 | 105 |
|  | 4.08 | 67.6 | 1.09 | 37 | 95 |
|  | 3.47 | 65.8 | 1.14 | 56 | 100 |
| B1 | 2.10 | 75.6 | 1.08 | 6 | 55 |
|  | 1.47 | 70.1 | 1.03 | 3 | 45 |
|  | 1.47 | 71.8 | 1.00 | 2 | 50 |
|  | 1.47 | 54.2 | 1.01 | 2 | 40 |
|  | 1.47 | 47.5 | 1.01 | 3 | 65 |

Example 2

Laboratory Testwork

Sample Preparation 5g of polymer was combined with 95 ml water and agitated for 2 hours to provide an aqueous solution of polymer for further dilution as required.

Sedimentation Testwork 1. 500 ml samples of site coal slurry containing 40.8 g/l solids were poured into measuring cylinders each fitted with a plunger to ensure homogeneity.
2. For each test the appropriate dose level of 0.05% polymer solution was added by decantation from an open top syringe and the cylinder plunger operated three times to ensure adequate mixing.
3. The settlement rate was measured between 3 and 8cm.
4. Settlement continued for a further minute and then the underflow volume was recorded and the supernatent clarity was measured using the clarity wedge.

The products evaluated were as follows:

Product D: Copolymer of 69 wt % acrylamide/31 wt % sodium acrylate, IV 24.0 dl/g. Total active polymer concentration was 0.05%.

Product B3: Blend of 90 wt % anionic polymer of 65wt % acrylamide/35 wt % sodium acrylate, IV 14.0 dl/g and 10 wt % cationic copolymer of 40 wt % acrylamide/60wt % DMAEA quaternised with methyl chloride, IV 7.0 dl.g. Total active polymer concentration was 0.05%.

TABLE 10

| Product | Dose (mg/l) | Settlement Rate (cm/min) | Clarity Wedge* | Compaction (cm³) |
|---|---|---|---|---|
| D | 5 | 1.0 | — | 350 |
|  | 6 | 5.3 | 26 | 280 |
|  | 7 | 7.1 | 25 | 240 |
|  | 8 | 23.1 | 24 | 190 |
|  | 9 | 20.6 | 24 | 200 |
| B3 | 3 | 3.4 | 22 | 290 |
|  | 5 | 14.1 | 28 | 200 |
|  | 6 | 21.2 | 35 | 190 |
|  | 7 | 24.5 | 39 | 190 |
|  | 8 | 29.0 | 46+ | 160 |
|  | 9 | 39.0 | 46+ | 160 |

Clarity wedge measurements of 0 are extremely turbid and 46+ extremely clear.

The results clearly show that the product of the invention B3 can give improved settlement rate, compaction and clarity in comparison with the standard product D.

What is claimed is:

1. A process of thickening an aqueous suspension of mineral solids having a mineral solids content of at least 5 g/l and not more than 125 g/l, by sedimentation comprising adding to the suspension a water-soluble anionic bridging polymeric flocculant having intrinsic viscosity of at least 5 dl/g and a water-soluble cationic polymeric flocculant, allowing the solids to settle under gravity so as to form a lower underflow fraction containing a concentration of solids greater than that of the suspension and an upper overflow fraction containing a concentration of solids lower than that of the suspension and removing the underflow fraction, characterized in that the anionic and cationic flocculants are added to the suspension as an aqueous composition formed by blending 1 part by weight of the cationic polymeric flocculant with 2 to 99 parts by weight of the anionic polymer floccculant and sufficient water to give total polymer concentration of below 5 wt % and under conditions whereby counter-ionic precipitation can occur and in the aqueous composition substantially all of the anionic polymeric flocculant which is not precipitated by the cationic polymeric flocculant is in solution and during addition of the aqueous composition to the aqueous suspension of mineral solids the suspension is subjected to low shear so that counterionic precipitation can occur.

2. A process according to claim 1 in which the aqueous composition comprises 1 part by weight of the cationic polymeric flocculant with 2 to 20 parts by weight of the anionic polymeric flocculant.

3. A process according to claim 1 which the cationic polymeric flocculant has intrinsic viscosity at least 2 dl/g.

4. A process according to claim 1 in which the anionic polymeric flocculant has intrinsic viscosity not more than 17 dl/g.

5. A process according to claim 1 in which the anionic polymeric flocculant is a bridging copolymer of acrylamide and sodium acrylate having intrinsic viscosity from 8 to 20 dl/g and the cationic polymeric flocculant is a bridging copolymer of acrylamide and dialkyl amino ethyl (meth) acrylate quaternary ammonium salt having intrinsic viscosity from 6 to 17 dl/g.

6. A process according to claim 1 in which sedimentation is carried out in a thickener provided with rakes which subject the underflow fraction to mixing.

7. A process according to claim 1 in which sedimentation is carried out in a thickening vessel and the aqueous composition containing anionic and cationic polymeric flocculants is added to the suspension in the thickening vessel.

8. A process according to claim 1 which is a continuous process.

9. A process according to claim 1 in which the aqueous suspension is a coal-based slurry, a sand effluent, a limestone effluent, a china clay slurry, a calcium carbonate slurry or a slurry which is tailings or concentrate from a hydrometallurgy operation and is based on zinc, copper or alumina.

10. A process according to claim 9 in which the aqueous suspension is a coal slurry.

* * * * *